(12) United States Patent
Morrison et al.

(10) Patent No.: US 9,191,897 B2
(45) Date of Patent: Nov. 17, 2015

(54) MOBILE DEVICE POWER MANAGEMENT WHILE PROVIDING LOCATION SERVICES

(71) Applicant: QUALCOMM Incorporated, San Diego, CA (US)

(72) Inventors: William James Morrison, San Francisco, CA (US); Benjamin A. Werner, Santa Clara, CA (US); Joseph Czompo, San Jose, CA (US); Vesa Veikko Ruuska, Tampere (FI); Tao Jia, San Jose, CA (US); Wyatt Thomas Riley, Chesterbrook, PA (US); Ashok Bhatia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 14/087,663

(22) Filed: Nov. 22, 2013

(65) Prior Publication Data
US 2014/0286213 A1 Sep. 25, 2014

Related U.S. Application Data

(60) Provisional application No. 61/804,477, filed on Mar. 22, 2013.

(51) Int. Cl.
*H04L 12/26* (2006.01)
*G08C 17/00* (2006.01)
(Continued)

(52) U.S. Cl.
CPC ............ *H04W 52/0261* (2013.01); *G01S 19/34* (2013.01); *H04W 4/02* (2013.01); *H04W 52/0264* (2013.01); *Y02B 60/50* (2013.01)

(58) Field of Classification Search
CPC ......... G01S 15/06; G01S 15/50; G01S 19/34; H04W 4/02; H04W 4/023; H04W 52/0219; H04W 52/0245; H04W 52/0261; H04W 64/00; H04W 84/18; H04W 4/027; H04W 24/02; H04W 52/0264; H04W 64/003; H04W 72/082; H04W 88/18; H04N 5/145; Y02B 60/50; Y02B 20/40; Y02B 60/34; Y02B 60/1282; H04L 12/5895; H04L 27/14641; H04L 27/14643; H04L 31/0547; H04L 41/1136; G08B 21/023; G06F 1/26
USPC ......... 370/252, 254–258, 310–350, 400–401, 370/431–437; 455/431–466
See application file for complete search history.

(56) References Cited

U.S. PATENT DOCUMENTS

| | | | |
|---|---|---|---|
| 5,491,486 A | | 2/1996 | Welles, II et al. |
| 7,184,777 B2 * | | 2/2007 | Diener ............... H04L 41/0896 455/456.1 |

(Continued)

OTHER PUBLICATIONS

International Search Report and Written Opinion—PCT/US2014/031433—ISA/EPO—Jun. 30, 2014.

*Primary Examiner* — Tri H Phan
(74) *Attorney, Agent, or Firm* — Muncy, Geissler, Olds & Lowe, P.C.

(57) ABSTRACT

The disclosure is related to managing power consumption of a user equipment (UE) while providing location services. An aspect determines whether a given sensor configuration of a plurality of sensor configurations minimizes power consumption of the UE, wherein a sensor configuration comprises a set of values for a set of one or more sensor parameters controllable by the UE, and, based upon the determining, sets the set of one or more sensor parameters to the given sensor configuration.

28 Claims, 9 Drawing Sheets

(51) Int. Cl.
*H04W 4/00* (2009.01)
*H04W 24/00* (2009.01)
*H04W 52/02* (2009.01)
*H04W 4/02* (2009.01)
*G01S 19/34* (2010.01)

(56) References Cited

U.S. PATENT DOCUMENTS

| | | | |
|---|---|---|---|
| 7,397,369 B2 * | 7/2008 | Zajac | G01D 21/02 |
| | | | 340/286.01 |
| 8,362,949 B2 * | 1/2013 | Yang et al. | 342/357.31 |
| 8,830,055 B2 * | 9/2014 | Lynch | B64C 25/00 |
| | | | 340/539.3 |
| 8,972,180 B1 * | 3/2015 | Zhao et al. | 701/468 |
| 8,977,288 B2 * | 3/2015 | Abraham et al. | 455/456.1 |
| 2010/0130229 A1 | 5/2010 | Sridhara et al. | |
| 2011/0148699 A1 | 6/2011 | Anderson et al. | |
| 2011/0296163 A1 | 12/2011 | Abernethy et al. | |
| 2011/0309977 A1 | 12/2011 | Daugherty, Jr. et al. | |
| 2011/0313650 A1 | 12/2011 | Tome | |
| 2012/0112958 A1 | 5/2012 | Alizadeh-Shabdiz et al. | |
| 2012/0326922 A1 | 12/2012 | Yang et al. | |
| 2013/0107727 A1 * | 5/2013 | Lunden et al. | 370/252 |
| 2015/0184442 A1 * | 7/2015 | Gantman | E05F 15/1607 |
| | | | 701/49 |

* cited by examiner

MOBILE DEVICE POWER MANAGEMENT WHILE PROVIDING LOCATION SERVICES

CROSS-REFERENCE TO RELATED APPLICATION

The present application for patent claims the benefit of U.S. Provisional Application No. 61/804,477, entitled "MOBILE DEVICE POWER MANAGEMENT WHILE PROVIDING LOCATION," filed Mar. 22, 2013, assigned to the assignee hereof, and expressly incorporated herein by reference in its entirety.

FIELD OF DISCLOSURE

Various aspects of the disclosure are related to mobile device power management while providing location services.

BACKGROUND

Mobile communications networks are in the process of offering increasingly sophisticated capabilities associated with the motion and/or position location sensing of a user equipment (UE). New software applications, such as, for example, those related to personal productivity, collaborative communications, social networking, and/or data acquisition, may utilize motion and/or position sensors to provide new features and services to consumers. Moreover, some regulatory requirements of various jurisdictions may require a network operator to report the location of a UE when the UE places a call to an emergency service, such as a 911 call in the United States.

Such motion and/or position determination capabilities have conventionally been provided using digital cellular positioning techniques and/or Satellite Positioning Systems (SPS). Additionally, with the increasing proliferation of miniaturized motion sensors (e.g., simple switches, accelerometers, angle sensors, etc.), such on-board devices may be used to provide relative position, velocity, acceleration and/or orientation information.

In conventional digital cellular networks, position location capability can be provided by various time and/or phase measurement techniques. For example, in Code Division Multiple Access (CDMA) networks, one position determination approach used is Advanced Forward Link Trilateration (AFLT). Using AFLT, a UE may compute its position from phase measurements of pilot signals transmitted from a plurality of base stations. Improvements to AFLT have been realized by utilizing hybrid position location techniques, where the UE may employ an SPS receiver that can provide position information independent of the information derived from the signals transmitted by the base stations. Moreover, position accuracy can be improved by combining measurements derived from both SPS and AFLT systems using conventional techniques.

Furthermore, navigation devices often support popular and increasingly important SPS wireless technologies which may include, for example, the Global Positioning System (GPS) and/or a Global Navigation Satellite System (GNSS). Navigation devices supporting SPS may obtain navigation signals as wireless transmissions received from one or more transmitter equipped satellites that may be used to estimate geographic position and heading. Some navigation devices may additionally or alternatively obtain navigation signals as wireless transmissions received from terrestrial based transmitters to estimate geographic position and heading and/or include one or more inertial sensors (e.g., accelerometers, gyroscopes, etc.) that reside on-board the navigation device to measure an inertial state of the navigation device. Inertial measurements obtained from these inertial sensors may be used in combination with or independent of navigation signals received from satellite and/or terrestrial based transmitters to provide estimates of geographic position and heading.

Sensor-assisted navigation techniques (e.g., navigating from a previous location fix using motion sensors) provide a significant improvement in positioning performance, but at the expense of increased power consumption. Power is used in operating device sensors, acquiring and tracking GNSS signals, and processing the high data rate information from these multiple sources. Accordingly, there is a need to mitigate the net power consumption when using sensor-assisted navigation techniques.

SUMMARY

The following presents a simplified summary relating to one or more aspects and/or embodiments associated with the mechanisms disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below The various aspects of the disclosure are related to managing power consumption of a user equipment (UE) while providing location services. A method for managing power consumption of a UE while providing location services includes determining whether a given sensor configuration of a plurality of sensor configurations minimizes power consumption of the UE, wherein a sensor configuration comprises a set of values for a set of one or more sensor parameters controllable by the UE, and, based upon the determining, setting the set of one or more sensor parameters to the given sensor configuration when the given sensor configuration minimizes power consumption of the UE.

An apparatus for managing power consumption of a UE while providing location services includes logic configured to determine whether a given sensor configuration of a plurality of sensor configurations minimizes power consumption of the UE, wherein a sensor configuration comprises a set of values for a set of one or more sensor parameters controllable by the UE, and logic configured to set the set of one or more sensor parameters to the given sensor configuration based upon the determining.

An apparatus for managing power consumption of a user equipment (UE) while providing location services includes means for determining whether a given sensor configuration of a plurality of sensor configurations minimizes power consumption of the UE, wherein a sensor configuration comprises a set of values for a set of one or more sensor parameters controllable by the UE, and means for setting the set of one or more sensor parameters to the given sensor configuration based upon the determining.

A non-transitory computer-readable medium for managing power consumption of a user equipment (UE) while providing location services includes at least one instruction to determine whether a given sensor configuration of a plurality of sensor configurations minimizes power consumption of the UE, wherein a sensor configuration comprises a set of values for a set of one or more sensor parameters controllable by the UE, and at least one instruction to set the set of one or more sensor parameters to the given sensor configuration based upon the determining.

Other objects and advantages associated with the mechanisms disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof.

The terminology used herein is for the purpose of describing particular embodiments only and is not intended to be limiting of embodiments of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
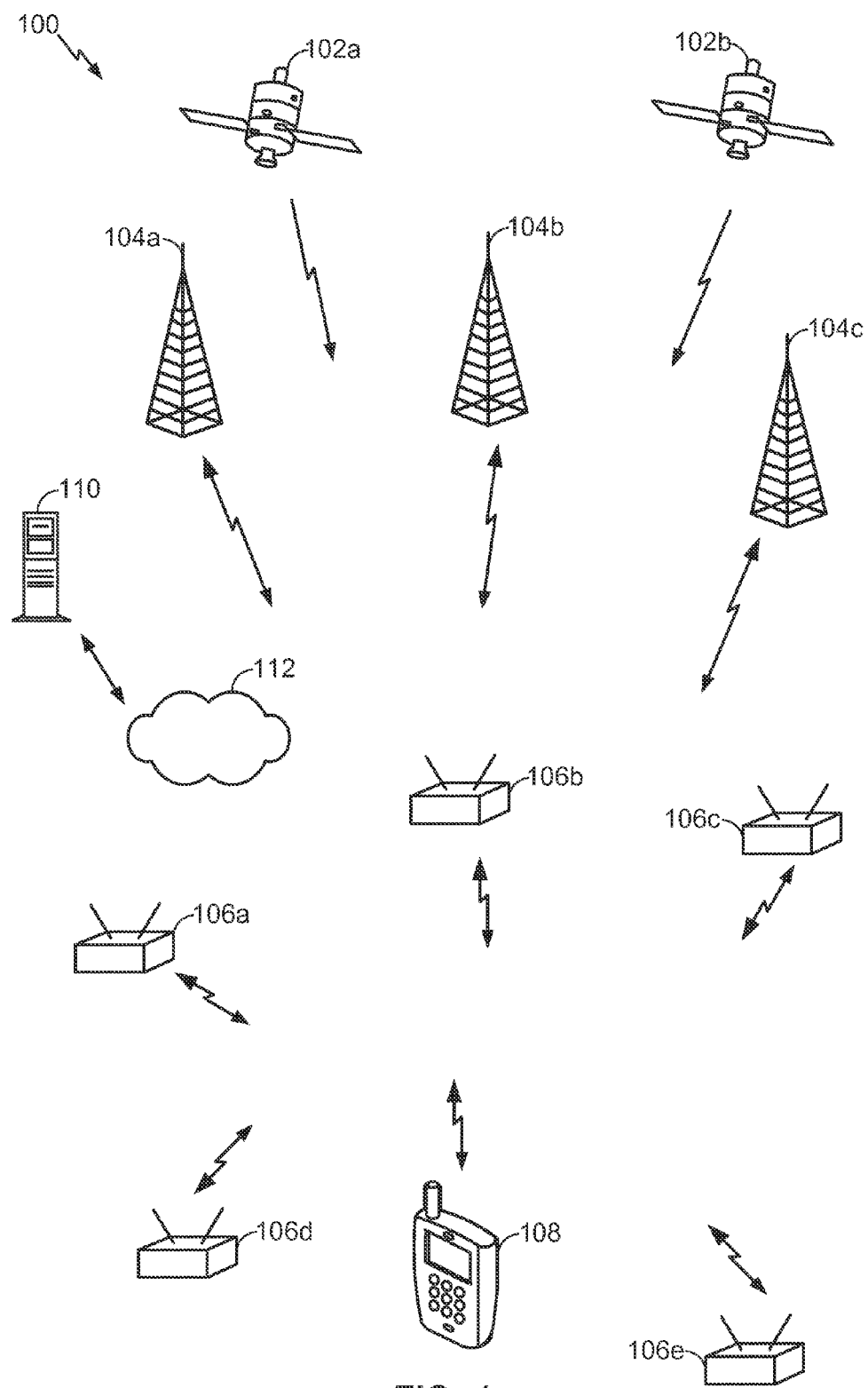
FIG. 1 illustrates an exemplary operating environment for a user equipment (UE) that can determine position using wireless techniques, according to one aspect of the disclosure.

According to one aspect of the disclosure, FIG. 1 illustrates an exemplary operating environment 100 for a UE 108 having wireless positioning capability. Embodiments are directed to a UE 108 which may determine its position based upon round trip time (RTT) measurements that are adjusted to accommodate for processing delays introduced by wireless access points. The processing delays may vary among different access points and may also change over time. By using information from a motion sensor, the UE 108 may calibrate out the effects of the processing delays introduced by the wireless access points.

The operating environment 100 may contain one or more different types of wireless communication systems and/or wireless positioning systems. In the embodiment shown in FIG. 1, a Satellite Positioning System (SPS) 102 may be used as an independent source of position information for the UE 108. The UE 108 may include one or more dedicated SPS receivers specifically designed to receive signals for deriving geo-location information from the SPS satellites.

The operating environment 100 may also include one or more Wide Area Network Wireless Access Points (WAN-WAPs) 104, which may be used for wireless voice and/or data communication, and as another source of independent position information for the UE 108. The WAN-WAPs 104 may be part of a wide area wireless network (WWAN), which may include cellular base stations at known locations, and/or other wide area wireless systems, such as, for example, WiMAX (e.g., 802.16). The WWAN may include other known network components which are not shown in FIG. 1 for simplicity. Typically, each of the WAN-WAPs 104a-104c within the WWAN may operate from fixed positions, and provide network coverage over large metropolitan and/or regional areas.

The operating environment 100 may further include one or more Local Area Network Wireless Access Points (LAN-WAPs) 106, which may be used for wireless voice and/or data communication, as well as another independent source of position data. The LAN-WAPs can be part of a Wireless Local Area Network (WLAN), which may operate in buildings and perform communications over smaller geographic regions than a WWAN. Such LAN-WAPs 106 may be part of, for example, Wi-Fi networks (802.11x), cellular piconets and/or femtocells, Bluetooth Networks, etc.

The UE 108 may derive position information from any one or more of the SPS satellites 102, the WAN-WAPs 104, and/or the LAN-WAPs 106. Each of the aforementioned systems can provide an independent estimate of the position for the UE 108 using different techniques. In some embodiments, the UE 108 may combine the solutions derived from each of the different types of access points to improve the accuracy of the position data. When deriving position using the SPS 102, the UE 108 may utilize a receiver specifically designed for use with the SPS that extracts position, using conventional techniques, from a plurality of signals transmitted by SPS satellites 102.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground-based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite," as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each WAN-WAPs 104a-104c may take the form of base stations within a digital cellular network, and the UE 108 may include a cellular transceiver and processor that can exploit the base station signals to derive position. Such cellular networks may include, but are not limited to, standards in accordance with GSM, CMDA, 2G, 3G, 4G, LTE, etc. It should be understood that digital cellular network may include additional base stations or other resources that may not be shown in FIG. 1. While WAN-WAPs 104 may actually be moveable or otherwise capable of being relocated, for illustration purposes it will be assumed that they are essentially arranged in a fixed position.

The UE 108 may perform position determination using known time-of-arrival (TOA) techniques such as, for example, Advanced Forward Link Trilateration (AFLT). In other embodiments, each WAN-WAP 104a-104c may comprise a Worldwide Interoperability for Microwave Access (WiMAX) wireless networking base station. In this case, the UE 108 may determine its position using TOA techniques from signals provided by the WAN-WAPs 104. The UE 108 may determine positions either in a stand-alone mode, or using the assistance of a positioning server 110 and network 112 using TOA techniques, as will be described in more detail below. Furthermore, various embodiments may have the UE 108 determine position information using WAN-WAPs 104, which may have different types. For example, some WAN-WAPs 104 may be cellular base stations, and other WAN-WAPs 104 may be WiMAX base stations. In such an operating environment, the UE 108 may be able to exploit the signals from each different type of WAN-WAP 104, and further combine the derived position solutions to improve accuracy.

When deriving position using the WLAN, the UE 108 may utilize time of arrival techniques with the assistance of the positioning server 110 and the network 112. The positioning server 110 may communicate to the UE 108 through network 112. Network 112 may include a combination of wired and wireless networks which incorporate the LAN-WAPs 106. In one embodiment, each LAN-WAP 106a-106e may be, for example, a Wi-Fi wireless access point, which is not necessarily set in a fixed position and can change location. The position of each LAN-WAP 106a-106e may be stored in the positioning server 110 in a common coordinate system. In one embodiment, the position of the UE 108 may be determined by having the UE 108 receive signals from each LAN-WAP 106a-106e. Each signal may be associated with its originating LAN-WAP based upon some form of identifying information that may be included in the received signal (such as, for example, a MAC address). The UE 108 may then sort the received signals based upon signal strength, and derive the time delays associated with each of the sorted received signals. The UE 108 may then form a message which can include the time delays and the identifying information of each of the LAN-WAPs, and send the message via network 112 to the positioning server 110. Based upon the received message, the positioning server may then determine a position, using the stored locations of the relevant LAN-WAPs 106, of the UE 108. The positioning server 110 may generate and provide a Location Configuration Indication (LCI) message to the UE 108 that includes a pointer to the position of the UE 108 in a local coordinate system. The LCI message may also include other points of interest in relation to the location of the UE 108. When computing the position of the UE 108, the positioning server may take into account the different delays which can be introduced by elements within the wireless network.

The position determination techniques described herein may be used for various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) and so on. A CDMA network may implement one or more radio access technologies (RATs) such as cdma2000, Wideband-CDMA (W-CDMA), and so on. cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Figure 2:
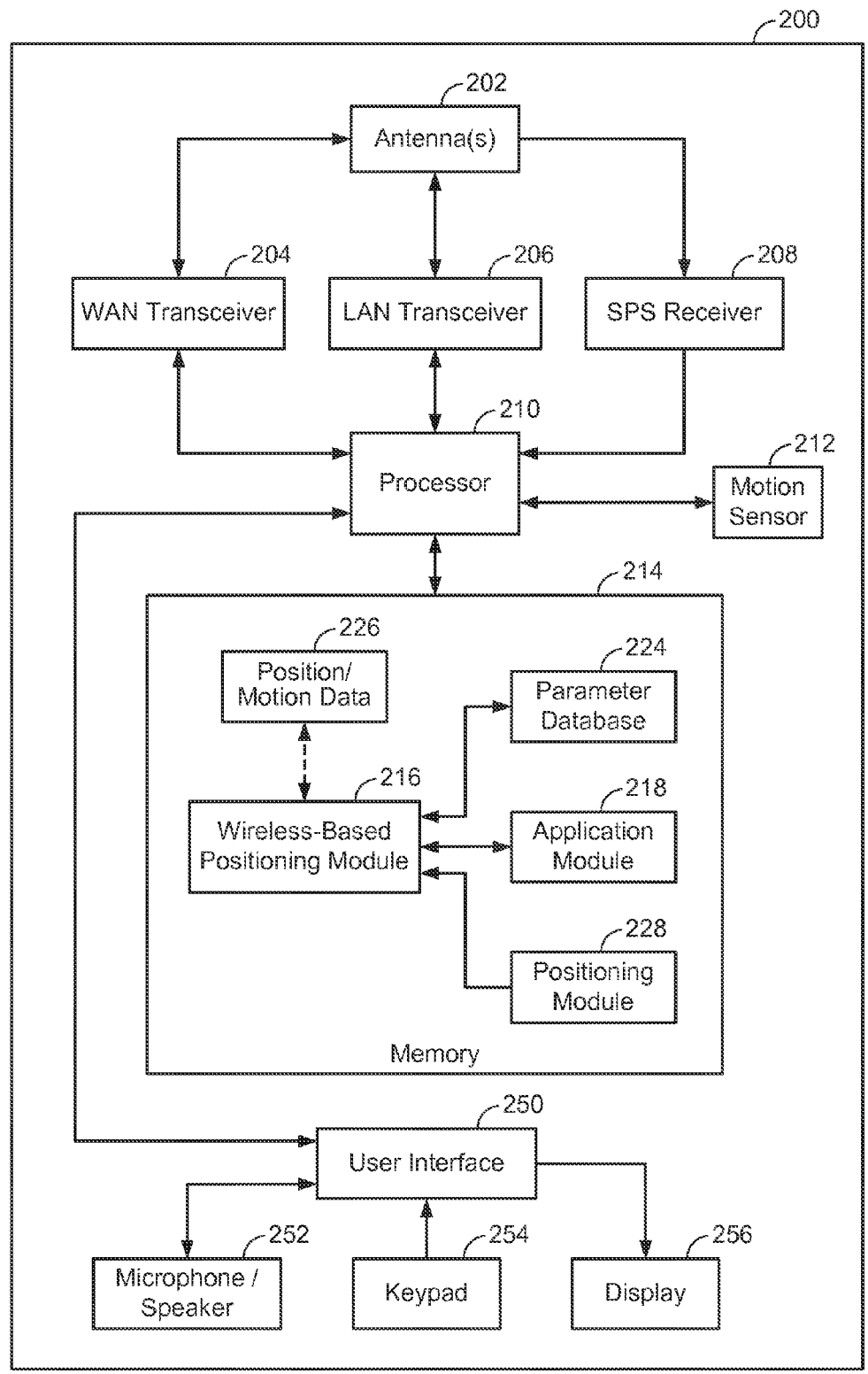
FIG. 2 illustrates an exemplary UE that may be used in an operating environment that can determine position using wireless techniques, according to one aspect of the disclosure.

FIG. 2 is a block diagram illustrating various components of an exemplary UE 200. For the sake of simplicity, the various features and functions illustrated in the box diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The UE 200 may include one or more wide area network (WAN) transceiver(s) 204 that may be connected to one or more antennas 202. The WAN transceiver 204 comprises suitable devices, hardware, and/or software for communicating with and/or detecting signals to/from WAN-WAPs 104, and/or directly with other wireless devices within a network. In one aspect, the WAN transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (802.16), etc. The UE 200 may also include one or more local area network (LAN) transceivers 206 that may be connected to one or more antennas 202. The LAN transceiver 206 comprises suitable devices, hardware, and/or software for communicating with and/or detecting signals to/from LAN-WAPs 106, and/or directly with other wireless devices within a network. In one aspect, the LAN transceiver 206 may comprise a Wi-Fi (802.11x) communication system suitable for communicating with one or more wireless access points; however in other aspects, the LAN transceiver 206 comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to LAN-WAPs 106 and/or WAN-WAPs 104. Specifically, in the description presented below, when the term "WAP" is used, it should be understood that embodiments may include a UE 200 that can exploit signals from a plurality of LAN-WAPs 106, a plurality of WAN-WAPs 104, or any combination of the two. The specific type of WAP being utilized by the UE 200 may depend upon the environment of operation. Moreover, the UE 200 may dynamically select between the various types of WAPs in order to arrive at an accurate position solution. In other embodiments, various network elements may operate in a peer-to-peer manner, whereby, for example, the UE 200 may be replaced with the WAP, or vice versa. Other peer-to-peer embodiments may include another UE (not shown) acting in place of one or more WAP.

An SPS receiver 208 may also be included in the UE 200. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the UE 200's position using measurements obtained by any suitable SPS algorithm.

A motion sensor 212 may be coupled to a processor 210 to provide movement and/or orientation information which is independent of motion data derived from signals received by the WAN transceiver 204, the LAN transceiver 206 and the SPS receiver 208.

By way of example, the motion sensor 212 may utilize an accelerometer (e.g., a microelectromechanical systems (MEMS device)), a gyroscope, a geomagnetic sensor (e.g., a compass), an altimeter (e.g., a barometric pressure altimeter), and/or any other type of movement detection sensor. Moreover, the motion sensor 212 may include a plurality of different types of devices and combine their outputs in order to provide motion information. For example, the motion sensor 212 may use a combination of a multi-axis accelerometer and orientation sensors to provide the ability to compute positions in 2-D and/or 3-D coordinate systems.

The processor 210 may be connected to the WAN transceiver 204, LAN transceiver 206, the SPS receiver 208 and the motion sensor 212. The processor 210 may include one or more microprocessors, microcontrollers, and/or digital signal processors that provide processing functions, as well as other calculation and control functionality. The processor 210 may also include memory 214 for storing data and software instructions for executing programmed functionality within the UE 200. The memory 214 may be on-board the processor 210 (e.g., within the same IC package), and/or the memory may be external memory to the processor and functionally coupled over a data bus. The functional details associated with aspects of the disclosure will be discussed in more detail below.

A number of software modules and data tables may reside in memory 214 and be utilized by the processor 210 in order to manage both communications and positioning determination functionality. As illustrated in FIG. 2, memory 214 may include and/or otherwise receive a wireless-based positioning module 216, an application module 218, and a positioning module 228. One should appreciate that the organization of the memory contents as shown in FIG. 2 is merely exemplary, and as such the functionality of the modules and/or data structures may be combined, separated, and/or be structured in different ways depending upon the implementation of the UE 200.

The application module 218 may be a process running on the processor 210 of the UE 200, which requests position information from the wireless-based positioning module 216. Applications typically run within an upper layer of the software architectures, and may include Indoor Navigation, Buddy Locator, Shopping and Coupons, Asset Tracking, and location Aware Service Discovery. The wireless-based positioning module 216 may derive the position of the UE 200 using information derived from time information measured from signals exchanged with a plurality of WAPs. In order to accurately determine position using time-based techniques, reasonable estimates of time delays, introduced by the processing time of each WAP, may be used to calibrate/adjust the time measurements obtained from the signals. As used herein, these time delays are referred to as "processing delays."

Calibration to further refine the processing delays of the WAPs may be performed using information obtained by the motion sensor 212. In one embodiment, the motion sensor 212 may directly provide position and/or orientation data to the processor 210, which may be stored in memory 214 in the position/motion data module 226. In other embodiments, the motion sensor 212 may provided data which should be further processed by processor 210 to derive information to perform the calibration. For example, the motion sensor 212 may provide acceleration and/or orientation data (single or multi-axis) which can be processed using positioning module 228 to derive position data for adjusting the processing delays in the wireless-based positioning module 216.

After calibration, the position may then be output to the application module 218 in response to its aforementioned request. In addition, the wireless-based positioning module 216 may utilize a parameter database 224 for exchanging operational parameters. Such parameters may include the determined processing delays for each WAP, the WAPs positions in a common coordinate frame, various parameters associated with the network, initial processing delay estimates, etc.

In other embodiments, the additional information may optionally include auxiliary position and/or motion data which may be determined from other sources besides the motion sensor 212, such as, for example, from SPS measurements. The auxiliary position data may be intermittent and/or noisy, but may be useful as another source of independent information for estimating the processing delays of the WAPs depending upon the environment in which the UE 200 is operating.

For example, in some embodiments, data derived from the SPS receiver 208 may supplement the position data supplied by the motion sensor 212 (either directly from the position/motion data module 226 or derived by the positioning module 228). In other embodiments, the position data may be combined with data determined through additional networks using non-RTT techniques (e.g., AFLT within a CDMA network). In certain implementations, the motion sensor 212 and/or the SPS receiver 208 may provide all or part of the auxiliary position/motion data 226 without further processing by the processor 210. In some embodiments, the auxiliary position/motion data 226 may be directly provided by the motion sensor 212 and/or the SPS receiver 208 to the processor 210.

While the modules shown in FIG. 2 are illustrated in the example as being contained in the memory 214, it is recognized that in certain implementations such procedures may be provided for or otherwise operatively arranged using other or additional mechanisms. For example, all or part of the wireless-based positioning module 216 and/or the application module 218 may be provided in firmware. Additionally, while in this example the wireless-based positioning module 216 and the application module 218 are illustrated as being separate features, it is recognized, for example, that such procedures may be combined together as one procedure or perhaps with other procedures, or otherwise further divided into a plurality of sub-procedures.

The processor 210 may include any form of logic suitable for performing at least the techniques provided herein. For example, the processor 210 may be operatively configurable based on instructions in the memory 214 to selectively initiate one or more routines that exploit motion data for use in other portions of the UE 200.

The UE 200 may include a user interface 250 which provides any suitable interface systems, such as a microphone/speaker 252, keypad 254, and display 256 that allows user interaction with the UE 200. The microphone/speaker 252 provides for voice communication services using the WAN transceiver 204 and/or the LAN transceiver 206. The keypad 254 comprises any suitable buttons for user input. The display 256 comprises any suitable display, such as, for example, a backlit LCD display, and may further include a touch screen display for additional user input modes.

As used herein, the UE 108 and/or UE 200 may be any portable or movable device or machine that is configurable to acquire wireless signals transmitted from, and transmit wireless signals to, one or more wireless communication devices or networks. As shown in FIG. 1 and FIG. 2, the UE 108 and/or UE 200 is representative of such a portable wireless device. Thus, by way of example but not limitation, the UE 108 may include a radio device, a cellular telephone device, a computing device, a personal communication system (PCS) device, or other like movable wireless communication equipped device, appliance, or machine. The term "user equipment" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "user equipment" is intended to include all devices, including wireless devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "user equipment."

As used herein, the terms "wireless device," "mobile station," "mobile device," "user equipment," etc. may refer to any type of wireless communication device which may transfer information over a network and also have position determination and/or navigation functionality. The wireless device may be any cellular mobile terminal, personal communication system (PCS) device, personal navigation device, laptop, personal digital assistant, or any other suitable device capable of receiving and processing network and/or SPS signals.

Figure 3:
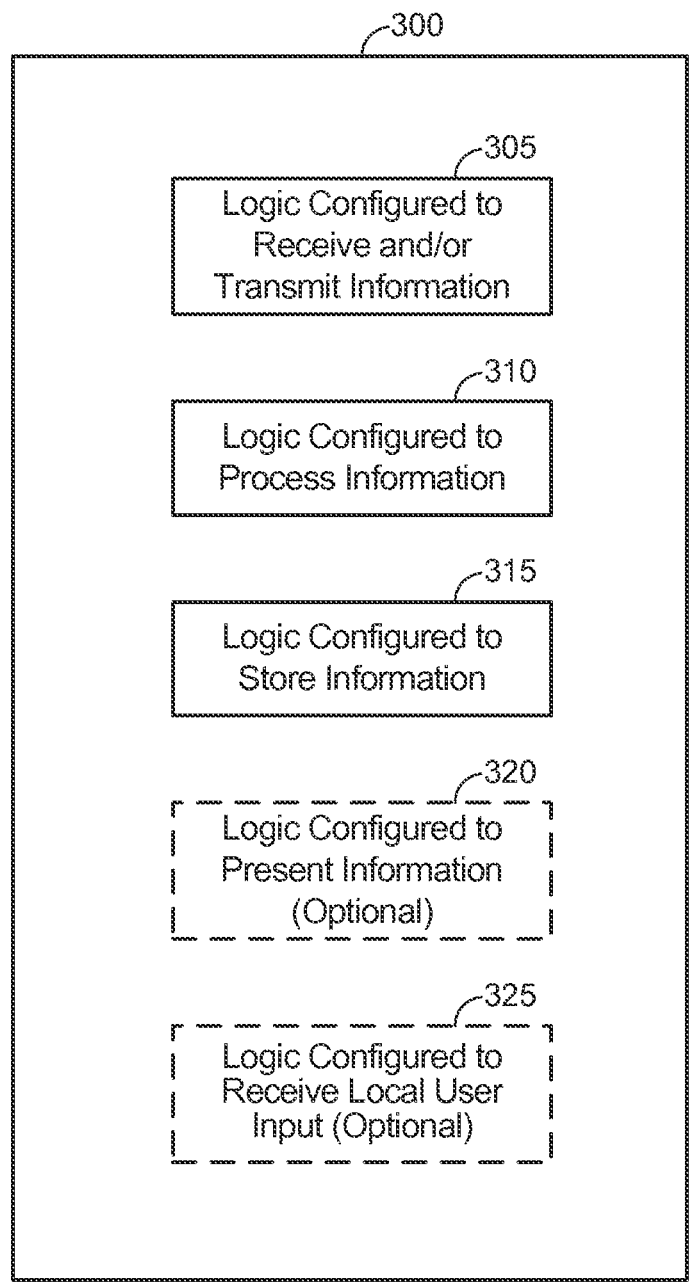
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to UE 108, UE 200, SPS satellites 102, WAN-WAPs 104, LAN-WAPs 106, positioning server 110, any component of the network 112, and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 108, UE 200), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet can be accessed, etc.). Thus, if the communication device 300 corresponds to some type of network-based server (e.g., the positioning server 110), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. As another example, the logic configured to process information 310 can include logic configured to determine whether a given sensor configuration of a plurality of sensor configurations minimizes power consumption of the UE, wherein a sensor configuration comprises a set of values for a set of one or more sensor parameters controllable by the UE, and logic configured to set the set of one or more sensor parameters to the given sensor configuration based upon the determining. The processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200 as shown in FIG. 2, the logic configured to present information 320 can include the speaker 252 and the display 256 of UE 200. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200 as shown in FIG. 2, the logic configured to receive local user input 325 can include the microphone 252, the keypad 254, the display 256, etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Sensor-assisted navigation techniques (e.g., using motion sensors to navigate from a previous location fix) provide a significant improvement in positioning performance, but at the expense of increased power consumption. Power is used in operating device motion sensors, such as motion sensor 212, acquiring and tracking GNSS signals with a GNSS receiver, such as SPS receiver 208, and processing the high data rate information from these multiple sources. Accordingly, there is a need to mitigate the net power consumption when using sensor-assisted navigation techniques.

Power consumption can be minimized while ensuring navigation accuracy by using previously observed information about the system and the environment. Achieving the desired navigation accuracy while achieving the minimum cost in terms of power consumption is possible through the optimal selection of the measurement duty cycles of the GNSS receiver(s), UE motion sensor(s), and/or vehicle sensor(s).

GNSS receivers, UE motion sensors, and vehicle sensors each have an associated power cost. The power cost is variable for each type of sensor, depending on the associated duty cycle. For example, a GNSS receiver can be run at 1/60 Hz, 1 Hz, or otherwise. Thus, given the navigation accuracy desired by the user and/or required by the application, a cost function can identify a particular sensor configuration (e.g., a particular set of duty cycles for the UE motion sensor(s), the GNSS receiver(s), and/or the vehicle sensor(s)) that minimizes power consumption. For example, if the user is a pedestrian, the UE is at absolute rest, and the horizontal estimated position error (HEPE) is already below the desired accuracy, then the GNSS receiver can be run at 1/60 Hz and the UE motion sensors can be used at low power to ensure that the user remains at absolute rest.

Figure 4:
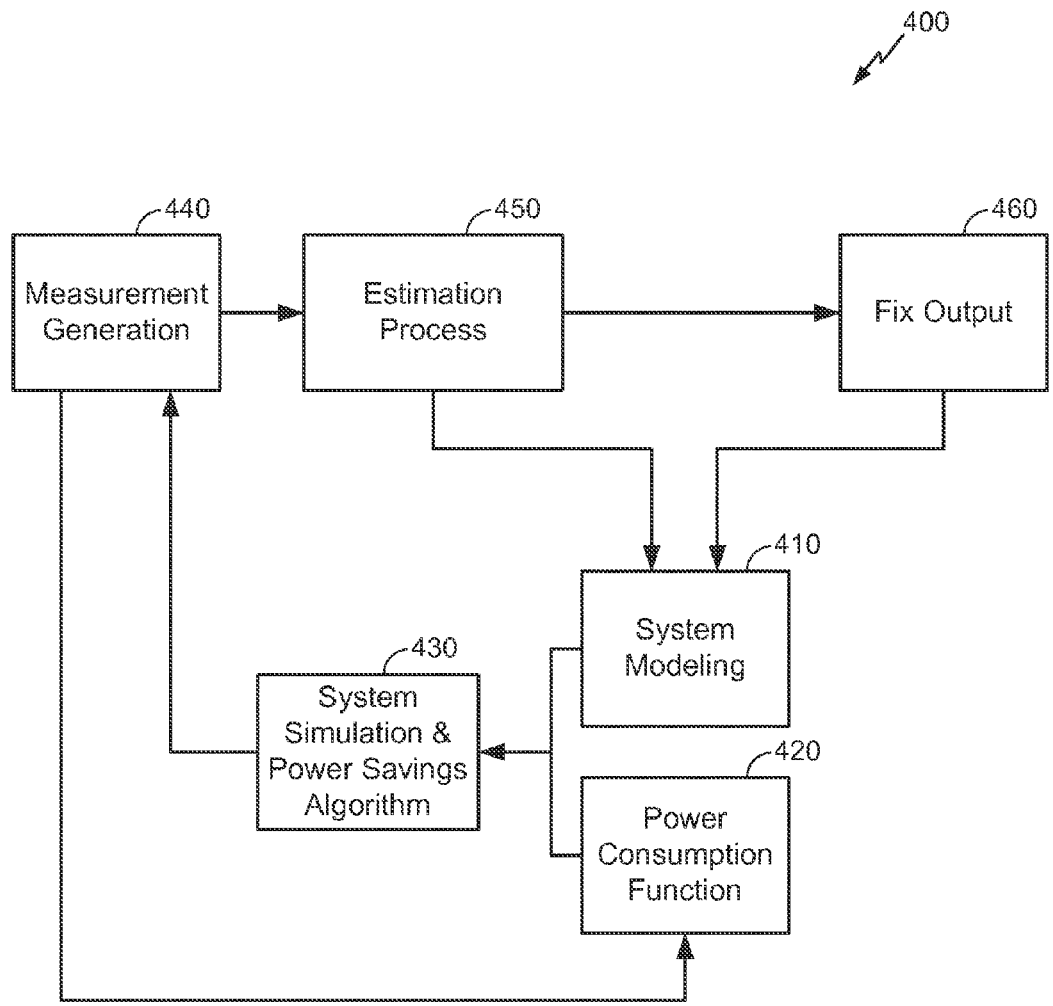
FIG. 4 illustrates an exemplary system for minimizing power consumption while ensuring navigation accuracy.

FIG. 4 illustrates an exemplary system 400 for minimizing power consumption while ensuring navigation accuracy. The various illustrative blocks in FIG. 4 may represent software objects, hardware circuits, a combination of hardware and software, or software being executed by one or more processors. The system 400 may be embodied in a UE, such as UE 108 or UE 200.

A system modeling function 410 provides a predictive system_model that uses previous location fix information generated by the fix output function 460 as well as data from the estimation process 450 to determine what future measurements will yield. A power consumption function 420 provides a predictive model of how much power will be used by the measurement generation function 440 to generate measurements. A system simulation and power savings algorithm 430 uses the system_model provided by the system modeling function 410 and the power consumption model provided by the power consumption function 420 to determine what measurements to generate next.

The following is the optimization problem theory for the power savings algorithm 430: The power used by a given sensor configuration and environment (represented as f_power(C, E)) should be minimized, subject to the model of the sensor configuration and environment (represented as M=f_system_model(C, E)), the system performance simulation (represented as P=f_system_sim(P0, M, E)), and the upper limit on the covariance that ensures navigation quality/accuracy (represented as f_quality(P) passes).

The following are definitions of various variables used by the power savings algorithm 430:

$s_i = \{M1\_i, M2\_i, \ldots MP\_i\}$: a sensor configuration choice. Each sensor has an ordered list of modes. This list is ordered by the amount of information provided to the estimation process 450 in FIG. 4. Mk_i should always provide more, or at least the same amount of, information as Mk+1_i.

C=<s1, s2, . . . sN>: a sensor configuration. This is the complete list of the parameters that are under the control of the power savings algorithm 430.

ei={D1_j, D2_j, . . . DQ_i}: an environmental condition set. Each environmental variable has a set of possible states.

E=<e1, e2, . . . eM>: environmental parameters. This is the complete list of parameters that are dynamic but are not under the control of the power savings algorithm 430.

f_power(C,E): a function that estimates power usage for a given sensor configuration and environment.

f_system_model(C,E): a function that gives the propagation and measurement models that would be used for a given sensor configuration and environment.

M: model parameters that allow the system to simulate covariance, including measurement and propagation models.

P0: the initial covariance of the estimator.

f_system_sim(P0, M, E): simulates the system given estimation model and environment model, and returns a measure of expected covariance.

P: The steady state covariance matrix.

f_quality(P): a function that determines navigation accuracy based on the covariance.

alpha: a scalar value that should not be exceeded.

Figure 5:
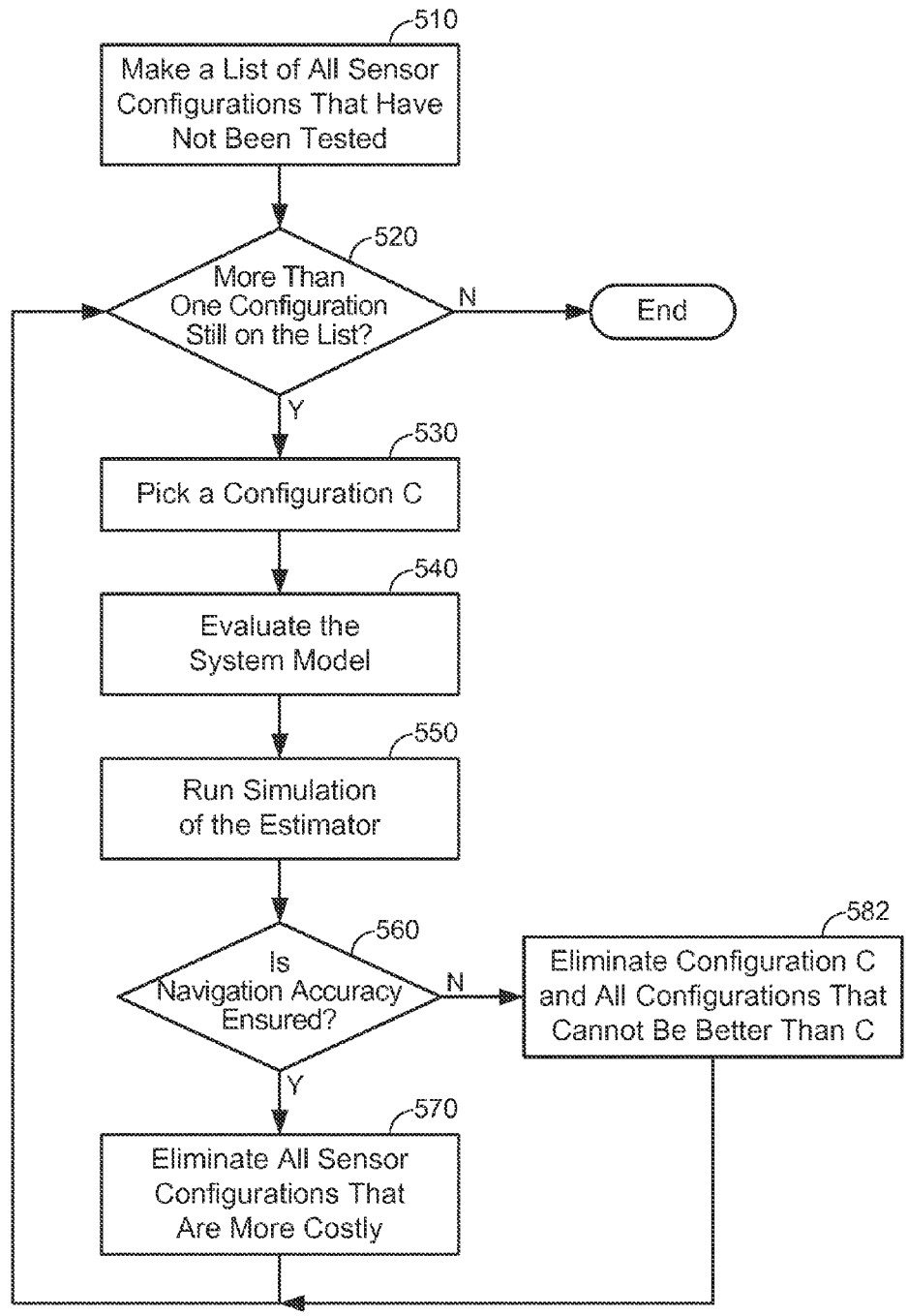
FIG. 5 is an exemplary flowchart illustrating the power savings algorithm of FIG. 4.

FIG. 5 is an exemplary flowchart illustrating the power savings algorithm 430 of FIG. 4. The power savings algorithm 430 may be implemented or performed by a UE, such as UE 108 or UE 200.

At 510, the power savings algorithm 430 makes a list of all sensor configurations that have not been tested. At 520, if there is more than one sensor configuration still in the list, then at 530, the power savings algorithm 430 picks a sensor configuration C. The power savings algorithm 430 may pick the sensor configuration C randomly, or intelligently, as discussed below with reference to FIG. 7. The power savings algorithm 430 sets the duty cycles of the sensors to the sensor configuration C.

At 540, the power savings algorithm 430 evaluates the system model generated by the system modeling function 410. At 550, the power savings algorithm 430 runs a simulation of the estimation process 450. A simulation of the estimation process 450 refers to any type of analysis that attempts to determine the accuracy of the navigation that will be produced by the estimation process 450. It should be noted that evaluating the system model and simulating the system for a given sensor configuration takes some amount of time.

At 560, the power savings algorithm 430 determines whether or not navigation accuracy is ensured when using the sensor configuration C. If navigation accuracy is ensured by the sensor configuration C, then at 570, the power savings algorithm 430 queries the power consumption function 420 to determine the cost of the remaining configurations and eliminates all sensor configurations that are more costly than the sensor configuration C. If, however, navigation accuracy is not ensured, then at 580, the power savings algorithm 430 queries the power consumption function 420 to determine the cost of the remaining configurations and eliminates sensor configuration C and all sensor configurations that cannot be better than C. The flow then returns to 520 to repeat blocks 520-580 as long as more than one sensor configuration is still on the list.

It should be noted that there are sensor configurations that cannot yield smaller covariance matrices than others. That is, some configurations are guaranteed to be equal to or worse than others. Additionally, there are sensor configurations that are more power consuming than others. Further, as noted above, evaluating the system model and simulating the system for a given sensor configuration takes some amount of time. The power savings algorithm 430 can be evaluated in real time based on the specific environment, or environmental conditions can be simulated beforehand and looked up in a table in real time, or both.

Figure 6:
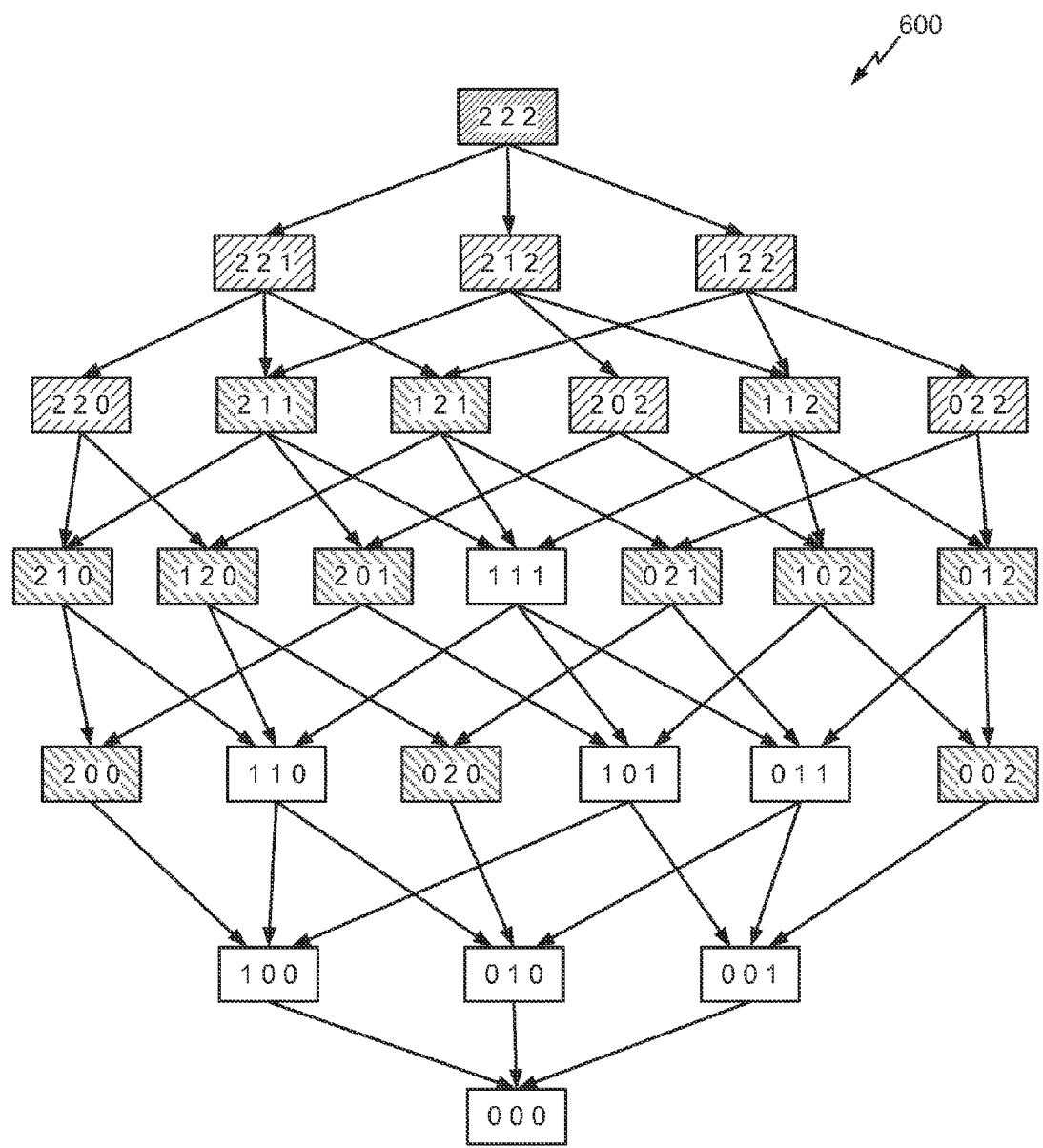
FIG. 6 illustrates an exemplary directed acyclic graph in which the various fill patterns illustrate the cost of a given sensor configuration.

There are various data structures that can be used to represent sensor configurations. For example, a directed acyclic graph can illustrate inferiority. FIG. 6 illustrates an exemplary directed acyclic graph 600 in which the various crosshatchings illustrate the cost of a given sensor configuration. Each node in graph 600 represents a particular sensor configuration C having three sensor parameters s1, s2, and s3. For example, the sensor parameters s1-s3 may be the duty cycles for the UE's accelerometer, GNSS receiver, and WLAN transceiver. The value of si (i.e., 0, 1, or 2) indicates the power setting, and thus power cost, for that sensor parameter. Accordingly, the sensor configuration C=<2 2 1> indicates that the power setting of sensor parameter s1 is "2," the power setting of sensor parameter s2 is "2," and the power setting of sensor parameter s3 is "1." As will be appreciated, there may be more or less than three sensor parameters and/or more or less than three power settings.

An edge on the graph 600 denotes that the destination node's covariance cannot be smaller than the source node's covariance. The relationship it transitive, meaning that if there is a path from one vertex to another, the same applies to the destination and source.

Figure 7:
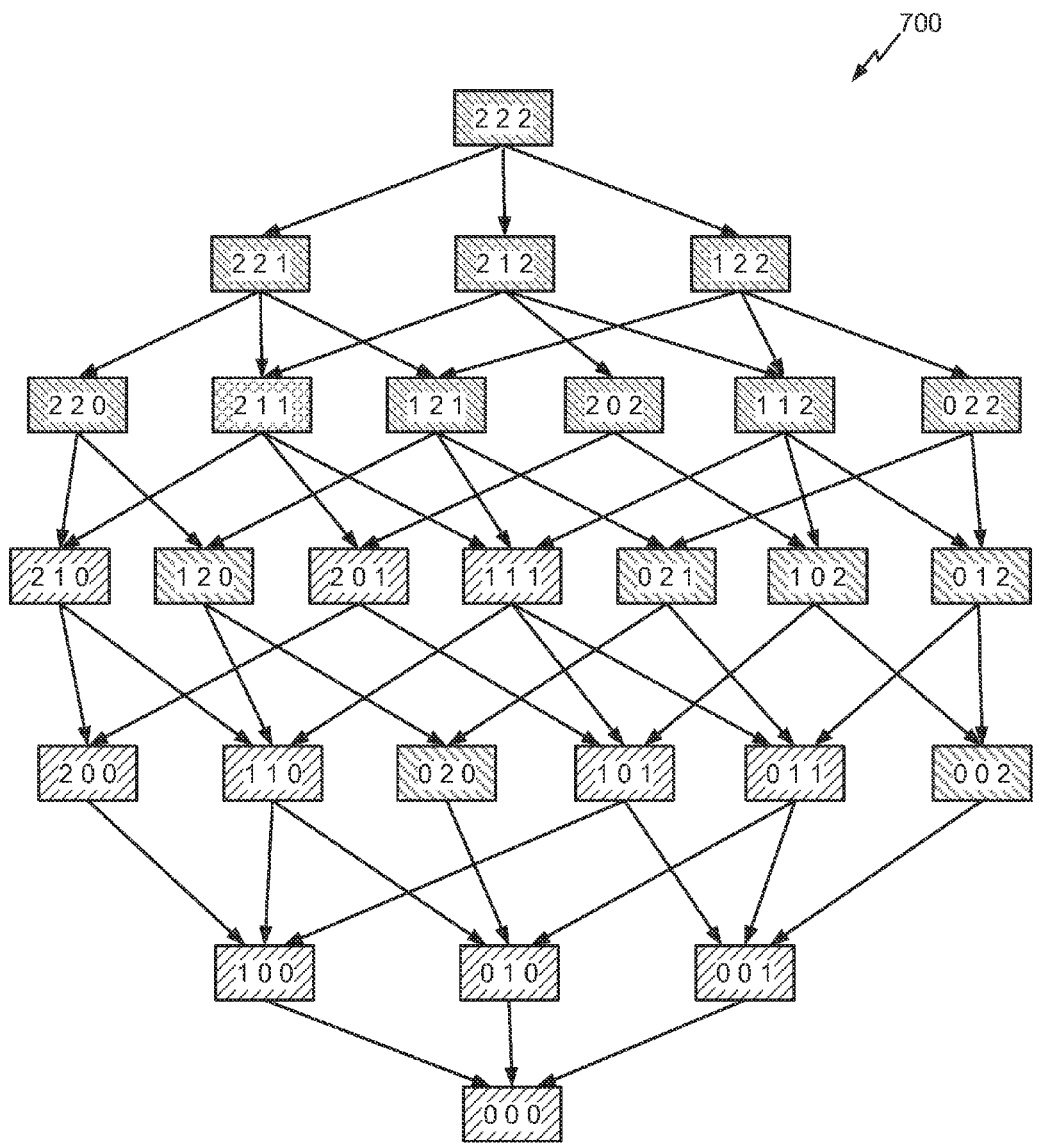
FIG. 7 illustrates an exemplary directed acyclic graph in which the various fill patterns illustrate sensor configurations that are inferior.

The outcome of testing a sensor configuration is the removal of other sensor configurations as the optimal solution. FIG. 7 illustrates an exemplary directed acyclic graph 700 in which the various crosshatchings illustrate sensor configurations that are inferior. As in FIG. 6, each node in graph 700 represents a particular sensor configuration C having three sensor parameters s1, s2, and s3, where the value of si (i.e., 0, 1, or 2) indicates the power setting, and thus power cost, for that sensor parameter.

Referring to 530 of FIG. 5, the power savings algorithm 430 picks a sensor configuration C to test. Depending on the performance of the chosen sensor configuration C, there may be other sensor configurations that do not need to be tested. For example, if the sensor configuration <2 1 1> is found to meet the navigation criteria, no sensor configuration in the same row or higher should be tested because they are all at least as costly. If the sensor configuration <2 1 1> is found to not meet the navigation criteria, no configuration with right diagonal crosshatching (e.g., <2 1 0>, <2 0 1>, <1 1 1>, etc.) should be tested because they are known to be inferior. It is still unknown whether or not sensor configurations indicated by left diagonal cross hatching (e.g., <1 2 0>, <0 2 1>, <1 0 2>, etc.) are the minimum solution or not, because they are less costly than the <2 1 1> sensor configuration and they are not inferior.

The following is an example application. A list of parameters that concern position estimation are shown in Table 1 below. Controllable sensor parameters are those that are decided by the power savings algorithm 430 in FIG. 4. Uncontrollable sensor parameters are inputs to the power savings algorithm 430, along with the current state of the estimation process 450 in FIG. 4 and covariance. In a Kalman filter, the state of the estimation process 450 would be a mean and covariance that represents the current position and related parameters. In Table 1, controllable parameter values to the left are worse than or equal to those to their right in terms of navigation performance, for each individual sensor parameter.

TABLE 1

| Parameter(s) | Values | | |
|---|---|---|---|
| Parameters Controlled by Power Savings Algorithm ({M1, M2, ...}) | | | |
| Device Sensors | Off | Low Rate | High Rate |
| GNSS measurements | Off | 1/10 sec DPO | 1/sec 1/sec DPO Non-DPO |
| WIFI Scanning | Off | 1/60 sec | 1/1 sec |
| Vehicle Odometry | Off | | On |
| Vehicle Gyro | Off | | On |
| Environmental Scenario Parameters ({D1, D2, ...}) | | | |
| GNSS Conditions | Open Sky | Challenged | Unavailable |
| User Motion Mode | Static | Walking | Vehicle |
| Vehicle Sensor Avail. | Yes | | No |

The following disclosure provides various examples of how the system 400 can be used to minimize power consumption while ensuring navigation accuracy.

There are various ways to save power when vehicle sensors and a UE are used together in a positioning system. In each of the following optimizations, a UE, such as UE 108 or UE 200, may be performing functions that rely on the position of the UE, such as running a navigation application, while in a vehicle equipped with motion sensors, such as a gyroscope, an accelerometer, and/or an odometer. Vehicles typically have at least one gyroscope and accelerometer, even if they do not have a built-in navigation system. The UE can communicate with the vehicle over a short-range communication system, such as Bluetooth.

As a first optimization, the UE can use data from the vehicle-mounted gyroscope and odometry system to perform sensor-assisted navigation, or augment GNSS navigation with sensor-assisted navigation techniques. When the UE can receive telematics data from the vehicle, the system 400 can instruct the UE to use this data to perform sensor-assisted navigation functions instead of using data from the UE's own motion sensors. As used herein, the term "telematics" refers to all data sourced from the vehicle. The system 400 can instruct the UE to turn off its own motion sensors, which can save power for the UE by offloading the functionality and power requirements of its motion sensors to the vehicle's motion sensors. Further, since the short-range communication system from the UE to the vehicle is often active for other reasons, obtaining vehicle sensor data may not introduce additional power cost.

As a second optimization, when the vehicle-mounted motion sensors and odometry system are calibrated well, and sensor-assisted navigation is performing well, it may be unnecessary for the UE to operate in a GNSS mode that requires large amounts of power. Accordingly, the system 400 can instruct the UE to reduce the frequency, or duty cycle, of the GNSS receiver without sacrificing much performance. A reduced GNSS duty cycle for the purpose of device power savings is possible when the position error is below a position error threshold. The system 400 can estimate the position error at a certain time based on the accuracy of processed measurement inputs (e.g., vehicle sensor, device sensor, GNSS, etc.), an uncertainty propagation model, and a process noise model. Therefore, at a certain period, the estimated position error can be compared to the position error threshold and the result used as feedback to increase or reduce the GNSS duty cycle. For example, if the current GNSS duty cycle is 10 seconds and the estimated position error grows above five meters, then the system 400 may increase the GNSS duty cycle to every five seconds. Once the estimated position error is again reduced below five meters, the GNSS duty cycle may return to once every 10 seconds.

As a third optimization, the system 400 can instruct the UE to turn off much of its navigation functionality when the vehicle odometry system indicates that no movement is occurring. This can include reducing the GNSS duty cycle and reducing the processing of data from the gyroscope (because the heading remains constant when the vehicle is not moving). In this case, the system 400 can use the lowest possible GNSS duty cycle and disable the motion sensors. The system 400 can continue to receive sensor data from the vehicle, however, so that it knows when to start navigating again and increase the GNSS duty cycle. The system 400 should not turn off the GNSS receiver because the UE may need to start navigating again quickly, and it takes time to reacquire GNSS signals once dropped.

It is also possible to conserve power when the UE cannot receive motion sensor data from another entity, such as when the user is walking. In each of the following optimizations, a UE may be performing functions that rely on the position of the UE, such as running a navigation application, while the UE is in a pedestrian mode. The UE can detect that it is in pedestrian mode by determining that its GNSS-derived velocity is commensurate with the velocity of a walking or running human and an integrated pedometer detecting that the user is taking steps.

As a first optimization, the system 400 can instruct the UE to reduce the frequency of scans for new local wireless networks, such as WiFi hotspots, when in a pedestrian mode. This optimization still provides efficient detection of new local wireless networks because, as a pedestrian, it will likely take the user a longer period of time to reach a new network. The UE may be using a local wireless network for navigation or for Internet access.

As a second optimization, if the system 400 determines that the GNSS signals it is receiving are poor quality (e.g., the signals are highly attenuated) and that the UE is in a pedestrian mode, it can reduce the GNSS duty cycle. It should be noted that in this case, the growth of the HEPE is limited because the user is walking and therefore will not be able to travel very far. The reason for this optimization is that if the GNSS signals are poor, there is no need for the UE to waste power trying to receive and process them.

There are other optimizations to conserve power when performing positioning functions that do not depend on vehicle-mounted motion sensors or the UE being in a pedestrian mode. For example, a motion state of "absolute rest" or "stationary" may indicate that the UE is at rest on a stable surface and its acceleration is close to zero. That is, the UE may be considered to be "stationary" or at "absolute rest" when its acceleration is below a threshold, where the threshold is close to zero. While this typically happens when the UE is not moving, i.e., its speed is zero, it can also happen in very smooth moving vehicles, such as a magnetic suspension train. As such, near-zero acceleration alone cannot be used to indicate the lack of motion. However, in combination with other indications, such as GNSS-derived velocity, that inference can be made.

As a first optimization, when the UE is at absolute rest, or stationary, the system 400 can turn off most of the positioning processing and motion sensors (other than the accelerometer) and simply perform low duty-cycle GNSS operations. In this case, low duty-cycle GNSS can be engaged independently of GNSS signal quality. When available, GNSS-derived velocity can be used to validate the stationary UE assumption.

When GNSS and external position injection (EPI) measurements are available and sufficiently good, the system 400 can update the navigation states in a dynamic mode. When these measurements become unavailable for a certain amount of time, the constant velocity propagation model can become increasingly unreliable. Even if a speed estimate is available (from, for example, an odometer or pedometer), the velocity direction may not be known and thus the solution cannot be meaningfully propagated into the last velocity direction. The position uncertainty grows linearly based on the speed measurements (e.g., the random ramp model) over an update interval. However, when there is acceleration, second order uncertainty growth can be approximated by the addition of piecewise linear velocity uncertainties with different slope across multiple update intervals.

As a second optimization, when performing sensor-assisted navigation techniques, computation, and thus power, can be reduced by propagating the covariance at a lower rate. That is, there is no need to update the uncertainty measurement as frequently if it is known that the UE's movement is constant. For example, if it is known that the UE is moving at a fixed velocity, the model for determining uncertainty does not need to be updated as frequently (i.e., the system 400 can use a longer update interval).

A high-priority, always-on fix timer can be used to determine a navigation solution. When the fix timer expires, a navigation solution (the "fix") needs to be delivered by the fix output 460 in FIG. 4. At this point, not all information may be available, usually because of latencies in obtaining the sensor data and/or latency of updates such as GNSS measurements, EPI, or DoT. As such, the fix output 460 delivers the best available solution based on potentially incomplete information available at the fix timer expiry, but also maintains the definitive solution, which is only computed when all possible information becomes available. Since expected information may be very late or even never become available, the definitive solution can be determined after a timeout.

As a third optimization, when processing asynchronous measurements, computation, and thus power, can be saved (while preserving filter performance) by storing intermediate Kalman filter (KF) states and covariances instead of recomputing them as information becomes available out of order. That is, instead of discarding previous measurements, the system 400 can buffer recent calculations. When a new measurement is received, it can be used to make subsequent calculations, rather than recomputing and correcting previous calculations.

Figure 8:
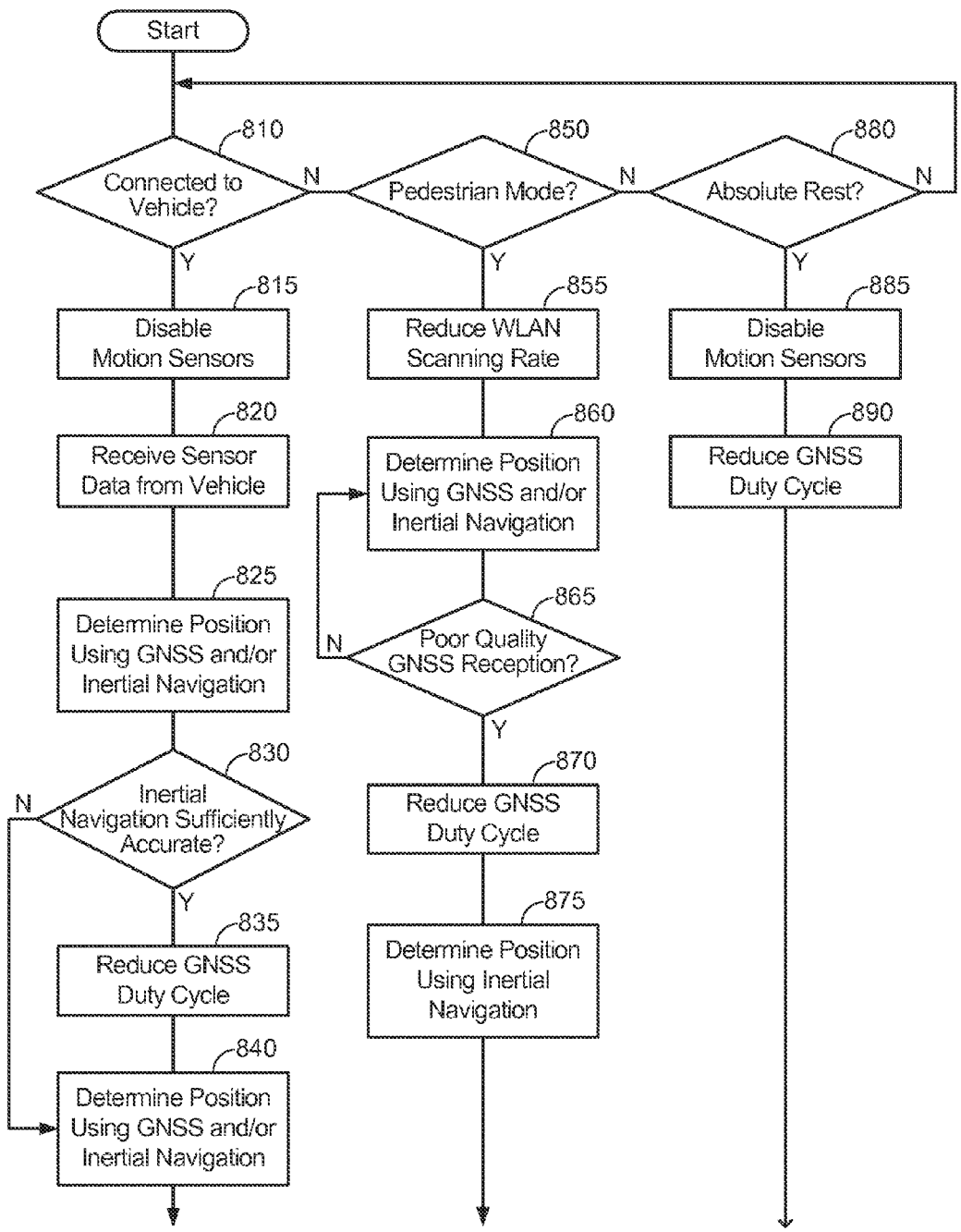
FIG. 8 illustrates an exemplary flow for managing UE power consumption while providing location services.

FIG. 8 is an exemplary flowchart illustrating the previously described examples for managing UE power consumption while providing location services. The flow illustrated in FIG. 8 may be performed by a UE, such as UE 108 or UE 200, that incorporates the system 400. At 810, the UE determines whether or not it is connected to a vehicle. As part of this determination, the UE may determine whether or not it can receive telematics data from the vehicle. The UE may make this determination in response to a user launching a navigation application on the UE, or some other application that uses the position of the UE.

In response to determining that the UE is connected to a vehicle and can receive sensor data from that vehicle, at 815, the UE disables its motion sensors, such as its accelerometer(s) and gyroscope(s). At 820, the UE receives telematics data from the vehicle, such as accelerometer data, gyroscope data, and/or odometer data. Although FIG. 8 illustrates the UE disabling its motion sensors before receiving the vehicle sensor data, the UE may disable its motion sensors and receive the vehicle sensor data substantially simultaneously, or in reverse of the order shown in FIG. 8.

At 825, the UE begins determining its position using GNSS timing signals and motion sensor data from the vehicle-mounted sensors. The UE may augment the GNSS position with inertial navigation techniques, or use inertial navigation techniques only, or primarily, if the GNSS signals are not available or not sufficiently accurate.

At 830, the UE determines whether or not the inertial navigation is sufficiently accurate. The UE may determine the accuracy of the inertial navigation by, for example, comparing the inertial navigation position estimations to the actual GNSS position determinations. Alternatively, the UE may determine that an uncertainty factor associated with the inertial navigation estimations is below a threshold. If the UE determines that the inertial navigation is sufficiently accurate, then at 835, the UE can reduce its GNSS duty cycle. For example, if the UE can accurately navigate for 10 seconds using inertial navigation, then it can do that and update its position using GNSS every 10 seconds. At 840, the UE determines its position using the reduced duty cycle GNSS signals augmented with the inertial navigation data from the vehicle-mounted odometry system.

If, at 810, the UE determines that it is not connected to a vehicle, then at 850, the UE can determine whether or not it is in a pedestrian mode. The UE may determine whether or not it is in a pedestrian mode by determining that its GNSS-derived velocity is commensurate with the velocity of a walking or running human and an integrated pedometer detecting that the user is taking steps.

At 855, if the UE determines that it is in a pedestrian mode, the UE reduces the scan rate for available local wireless networks. The new scan rate may be based on the velocity of the UE. For example, if the UE is moving at approximately the speed of a running human, it can scan for available local wireless networks more frequently than if it is moving at approximately the speed of a walking human, because a running human will move through the coverage area of a local wireless network faster than a walking human will.

At 860, the UE begins determining its position using GNSS timing signals and data from its own motion sensors. The UE may augment the determined GNSS position with inertial navigation techniques.

At 865, the UE determines whether or not the received GNSS signals are highly attenuated (i.e., poor quality). This may occur where the GNSS signals are blocked, such as at an indoor location, in an urban environment, etc. If the GNSS signals are highly attenuated, then at 870, the UE can reduce the GNSS duty cycle to a minimum, as there is no need for the UE to waste power trying to process these poor quality GNSS signals. At 875, the UE can determine its position using inertial navigation only, as the GNSS signals are not accurate enough to use for positioning determinations.

If, however, at 865, the UE determines that the GNSS signals are of sufficient quality, then the flow returns to 860, and the UE can continue determining its position using the GNSS signals. The UE may continue to perform the loop at 860 to 865 until it begins receiving poor quality GNSS signals or exits the pedestrian mode.

If, at 850, the UE determines that it is not in a pedestrian mode, then at 880, the UE can determine whether or not it is at absolute rest, i.e., whether or not its acceleration is below a near-zero threshold. If it is not, then the flow of FIG. 8 begins again. If it is, however, then at 885, the UE can disable its motion sensors, other than the accelerometer, and at 890, can reduce the GNSS duty cycle. Although 885 and 890 are illustrated in FIG. 8 as occurring sequentially, they may occur substantially simultaneously or in the reverse order as that shown in FIG. 8.

Figure 9:
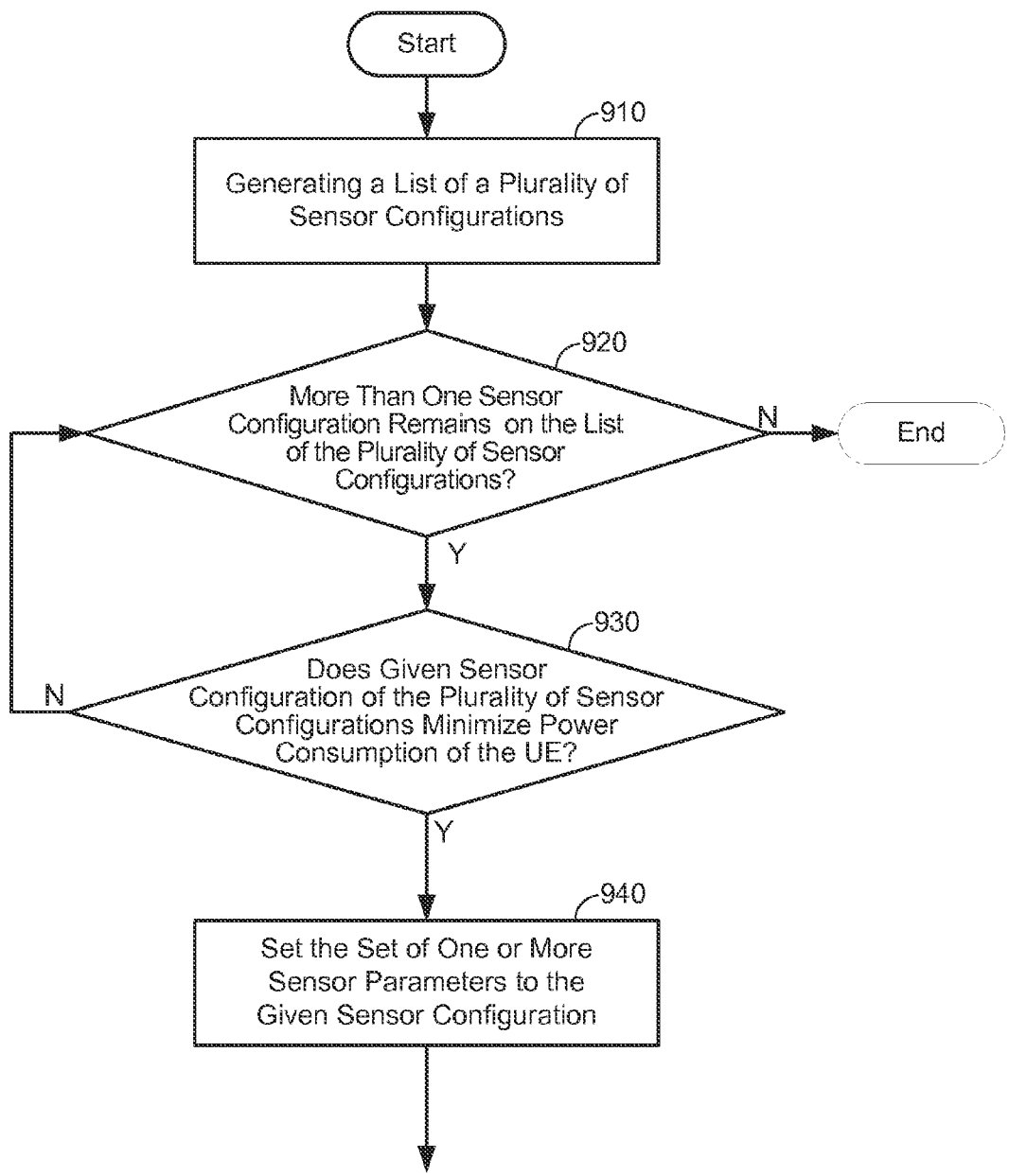
FIG. 9 illustrates an exemplary flow for managing power consumption of a UE while providing a lower power positioning service.

FIG. 9 illustrates an exemplary flow for managing power consumption of a UE while providing location services. The flow illustrated in FIG. 9 may be performed by a UE, such as UE 108 or UE 200, that incorporates the system 400 of FIG. 4.

At 910, the UE generates a list of a plurality of sensor configurations. The plurality of sensor configurations may be sensor configurations that have not been tested, as described with reference to 510 of FIG. 5. A sensor configuration may be a set of values for a set of one or more sensor parameters controllable by the UE. The set of one or more sensor parameters may include sensor parameters that influence power consumption of the UE. Each of the plurality of sensor configurations may include the set of one or more sensor parameters. Each sensor configuration of the plurality of sensor configurations may include a different set of values of the one or more sensor parameters.

The set of one or more sensor parameters may include sensor parameters related to one or more motion sensors, a satellite positioning system receiver, and/or a wireless local area network transceiver. The one or more motion sensors may include an accelerometer and/or a gyroscope.

At 920, the UE determines whether or not more than one sensor configuration remains on the list of the plurality of sensor configurations, as described with reference to 520 of FIG. 5. If more than one sensor configuration remains on the list, the flow proceeds to 930. If not, the flow ends.

At 930, the UE determines whether or not a given sensor configuration of the plurality of sensor configurations minimizes power consumption of the UE. The determining may include determining whether or not an accuracy of the location services is above a threshold for the given sensor configuration. If the accuracy of the location services is above the threshold, the UE eliminates all sensor configurations of the plurality of sensor configurations that consume more power than the given sensor configuration. However, if the accuracy of the location services is not above the threshold, the UE eliminates the given sensor configuration and all sensor configurations of the plurality of sensor configurations that cannot provide better positioning accuracy than the given sensor configuration.

If the given sensor configuration of the plurality of sensor configurations does not minimize the power consumption of the UE, the flow returns to 920. Otherwise, at 940, the UE sets the set of one or more sensor parameters to the given sensor configuration.

The flow illustrated in FIG. 9 may also optionally include determining whether or not the UE can receive sensor data from a vehicle (not shown). In that case, the setting at 940 may include disabling motion sensors resident on the UE and using sensor data received from the vehicle to perform inertial navigation positioning techniques if the UE can receive sensor data from the vehicle, as discussed above with reference to 815-840 of FIG. 8. The given sensor configuration may define these actions. Specifically, setting the one or more sensor parameters to the given sensor configuration may cause the UE to disable the motion sensors resident on the UE and to use the sensor data received from the vehicle. The sensor data received from the vehicle may include accelerometer data, gyroscope data, and/or odometer data.

The flow illustrated in FIG. 9 may also optionally include determining whether or not the UE is in a pedestrian mode (not shown). In that case, the setting at 940 may include reducing a frequency of scanning for available local wireless networks if the UE is in the pedestrian mode, as discussed above with reference to 855-875 of FIG. 8. The given sensor configuration may define these actions. Specifically, setting the one or more sensor parameters to the given sensor configuration may cause the UE to reduce the frequency of scanning for available local wireless networks.

The flow illustrated in FIG. 9 may also optionally include determining whether or not an acceleration of the UE is below an acceleration threshold (not shown). In that case, the setting at 940 may include disabling motion sensors resident on the UE other than an accelerometer if the acceleration is below the acceleration threshold, as discussed above with reference to 885 and 890 of FIG. 8. The given sensor configuration may define these actions. Specifically, setting the one or more sensor parameters to the given sensor configuration may cause the UE to disable the motion sensors resident on the UE other than the accelerometer.

As illustrated, the various aspects of the disclosure are directed to conserving power without compromising performance. To that end, the various aspects do not use motion sensor data or GNSS measurements unless they provide value. For example, if a UE is determining its position with sufficient accuracy using GNSS measurements alone, or sensor-assisted navigation alone, then there is no need to augment with inertial navigation techniques or GNSS positioning, respectively. Similarly, if GNSS and/or sensor-assisted positioning is sufficiently poor (e.g. highly attenuated GNSS signals), then there is no need to waste power trying to improve it. It is better to simply disable it.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for managing power consumption of a user equipment (UE) while providing location services, comprising:
   determining whether an accuracy of the location services is above a threshold for a given sensor configuration of a plurality of sensor configurations, wherein each sensor configuration of the plurality of sensor configurations comprises a set of values for a set of one or more sensor parameters controllable by the UE;
   eliminating all sensor configurations of the plurality of sensor configurations that consume more power than the given sensor configuration based on the accuracy of the location services being above the threshold, and eliminating the given sensor configuration and all sensor configurations of the plurality of sensor configurations that cannot provide better positioning accuracy than the given sensor configuration based on the accuracy of the location services not being above the threshold; and
   setting the set of one or more sensor parameters to minimize the power consumption of the UE based on the eliminating.

2. The method of claim 1, further comprising:
   generating a list of the plurality of sensor configurations, wherein the plurality of sensor configurations comprise sensor configurations that have not been tested.

3. The method of claim 2, further comprising:
   determining whether more than one sensor configuration remains on the list of the plurality of sensor configurations; and
   performing the determining based on more than one sensor configuration remaining on the list of the plurality of sensor configurations.

4. The method of claim 1, wherein each of the plurality of sensor configurations comprises the set of one or more sensor parameters.

5. The method of claim 1, wherein the set of one or more sensor parameters comprises sensor parameters that influence power consumption of the UE.

6. The method of claim 1, wherein each sensor configuration of the plurality of sensor configurations comprises a different set of values of the set of one or more sensor parameters.

7. The method of claim 1, wherein the set of one or more sensor parameters comprises sensor parameters related to one or more motion sensors, a satellite positioning system receiver, and/or a wireless local area network transceiver.

8. The method of claim 1, further comprising:
   determining whether or not the UE can receive sensor data from a vehicle, and wherein the setting comprises disabling motion sensors resident on the UE and using the sensor data received from the vehicle to perform inertial navigation positioning techniques based on the UE being able to receive the sensor data from the vehicle.

9. The method of claim 8, wherein the sensor data received from the vehicle comprises accelerometer data, gyroscope data, and/or odometer data.

10. The method of claim 8, wherein the setting the set of one or more sensor parameters causes the UE to disable the motion sensors resident on the UE and to use the sensor data received from the vehicle.

11. The method of claim 1, further comprising:
    determining whether or not the UE is in a pedestrian mode, and wherein the setting comprises reducing a frequency of scanning for available local wireless networks based on the UE being in the pedestrian mode.

12. The method of claim 11, wherein the setting the set of one or more sensor parameters causes the UE to reduce the frequency of scanning for available local wireless networks.

13. The method of claim 1, further comprising:
    determining whether an acceleration of the UE is below an acceleration threshold, and wherein the setting comprises disabling motion sensors resident on the UE other than an accelerometer based on the acceleration being below the acceleration threshold.

14. The method of claim 13, wherein the setting the set of one or more sensor parameters causes the UE to disable the motion sensors resident on the UE other than the accelerometer.

15. An apparatus for managing power consumption of a user equipment (UE) while providing location services, comprising:
    logic configured to determine whether an accuracy of the location services is above a threshold for a given sensor configuration of a plurality of sensor configurations, wherein each sensor configuration of the plurality of sensor configurations comprises a set of values for a set of one or more sensor parameters controllable by the UE;

logic configured to eliminate all sensor configurations of the plurality of sensor configurations that consume more power than the given sensor configuration based on the accuracy of the location services being above the threshold, and to eliminate the given sensor configuration and all sensor configurations of the plurality of sensor configurations that cannot provide better positioning accuracy than the given sensor configuration based on the accuracy of the location services not being above the threshold; and logic configured to set the set of one or more sensor parameters to minimize the power consumption of the UE based on the elimination.

16. The apparatus of claim 15, further comprising:
logic configured to generate a list of the plurality of sensor configurations, wherein the plurality of sensor configurations comprise sensor configurations that have not been tested.

17. The apparatus of claim 16, further comprising:
logic configured to determine whether or not more than one sensor configuration remains on the list of the plurality of sensor configurations;
wherein the logic configured to determine whether the accuracy of the location services is above the threshold comprises logic configured to determine whether the accuracy of the location services is above the threshold based on more than one sensor configuration remaining on the list of the plurality of sensor configurations.

18. The apparatus of claim 15, wherein each of the plurality of sensor configurations comprises the set of one or more sensor parameters.

19. The apparatus of claim 15, wherein the set of one or more sensor parameters comprises sensor parameters related to one or more motion sensors, a satellite positioning system receiver, and/or a wireless local area network transceiver.

20. The apparatus of claim 15, further comprising:
logic configured to determine whether or not the UE can receive sensor data from a vehicle,
wherein the logic configured to set comprises logic configured to disable motion sensors resident on the UE and to use the sensor data received from the vehicle to perform inertial navigation positioning techniques based on the UE being able to receive the sensor data from the vehicle.

21. The apparatus of claim 20, wherein the sensor data received from the vehicle comprises accelerometer data, gyroscope data, and/or odometer data.

22. The apparatus of claim 20, wherein the logic configured to set the set of one or more sensor parameters causes the UE to disable the motion sensors resident on the UE and to use the sensor data received from the vehicle.

23. The apparatus of claim 15, further comprising:
logic configured to determine whether or not the UE is in a pedestrian mode,
wherein the logic configured to set comprises logic configured to reduce a frequency of scanning for available local wireless networks based on the UE being in the pedestrian mode.

24. The apparatus of claim 23, wherein the logic configured to set the set of one or more sensor parameters causes the UE to reduce the frequency of scanning for available local wireless networks.

25. The apparatus of claim 15, further comprising:
logic configured to determine whether or not an acceleration of the UE is below an acceleration threshold,
wherein the logic configured to set comprises logic configured to disable motion sensors resident on the UE other than an accelerometer based on the acceleration being below the acceleration threshold.

26. The apparatus of claim 25, wherein the logic configured to set the set of one or more sensor parameters causes the UE to disable the motion sensors resident on the UE other than the accelerometer.

27. An apparatus for managing power consumption of a user equipment (UE) while providing location services, comprising:
means for determining whether an accuracy of the location services is above a threshold for a given sensor configuration of a plurality of sensor configurations, wherein each sensor configuration of the plurality of sensor configurations comprises a set of values for a set of one or more sensor parameters controllable by the UE;
means for eliminating all sensor configurations of the plurality of sensor configurations that consume more power than the given sensor configuration based on the accuracy of the location services being above the threshold, and for eliminating the given sensor configuration and all sensor configurations of the plurality of sensor configurations that cannot provide better positioning accuracy than the given sensor configuration based on the accuracy of the location services not being above the threshold; and
means for setting the set of one or more sensor parameters to minimize the power consumption of the UE based on the elimination.

28. A non-transitory computer-readable medium for managing power consumption of a user equipment (UE) while providing location services, comprising:
at least one instruction to determine whether an accuracy of the location services is above a threshold for a given sensor configuration of a plurality of sensor configurations, wherein each sensor configuration of the plurality of sensor configurations comprises a set of values for a set of one or more sensor parameters controllable by the UE;
at least one instruction to eliminate all sensor configurations of the plurality of sensor configurations that consume more power than the given sensor configuration based on the accuracy of the location services being above the threshold, and to eliminate the given sensor configuration and all sensor configurations of the plurality of sensor configurations that cannot provide better positioning accuracy than the given sensor configuration based on the accuracy of the location services not being above the threshold; and
at least one instruction to set the set of one or more sensor parameters to minimize the power consumption of the UE based on the elimination.

* * * * *